United States Patent Office 3,798,180
Patented Mar. 19, 1974

3,798,180
BUILDER-CONTAINING DETERGENT
COMPOSITIONS
Helmut Westernacher, Marl, Germany, assignor to
Chemische Werke Huls Aktiengesellschaft, Marl, Germany
No Drawing. Filed Nov. 10, 1971, Ser. No. 197,491
Claims priority, application Germany, Nov. 19, 1970,
P 20 56 814.3
Int. Cl. C11d 3/066, 3/07
U.S. Cl. 252—527                                                   31 Claims

ABSTRACT OF THE DISCLOSURE

Washing compositions containing a detergent and, as a builder, a water soluble salt of an amino partial amide of a polymeric carboxylic acid, e.g., styrene-maleic anhydride copolymer.

BACKGROUND OF THE INVENTION

This invention relates to washing agents, more particularly detergent compositions containing, as a builder, a water-soluble salt of a polymer of an unsaturated polycarboxylic acid.

It is known that the addition of certain substances which per se do not possess any cleansing power can increase the cleansing power of soaps and synthetic detergents and mixtures thereof. Such substances are called supporting compounds, constructive compounds or, more commonly, builders.

The theoretical basis for the effects of such builders is not yet known. Therefore it is impossible to predict which types of compounds will be suitable as a builder.

The difficulties in understanding the theoretical basis for the action of builders is the large number of individual effects which contribute in total to the enhancement of the cleansing power of the detergents, viz., neutralization of acidic dirt; inactivation of mineral components present in the laundering solution; solubilization or emulsification of water-insoluble dirt particles; stabilization of solid dirt suspensions; peptization of dirt agglomerates; and regulation of the sudsing action of the washing liquor.

Various inorganic substances are known to be useful as builders, e.g., alkali carbonates, alkali borates, alkali phosphates, alkali polyphosphates, alkali bicarbonates and alkali silicates.

The alkali polyphosphates are excellent builders and are utilized almost exclusively. However, the use of the alkali phosphates as builders in washing agents entails two disadvantages. On the one hand, they readily hydrolyze into lower phosphates, which are low-quality builders and, on the other hand, they promote the growth of algae in rivers and lakes to such an extent that the oxygen content of the water is considerably disturbed (Chemical and Engineering News, 44, 1969, pp. 5 et seq.; 53, 1969, pp. 7 et seq.).

Because of the adverse ecological effects of phosphate builders, organic compounds have also been employed as builders. Examples of such builders are sodium and potassium ethylenediaminetetraacetate, sodium- and potassium-N-(2-hydroxyethyl) - ethylenediaminetriacetate, sodium- and potassium- and triethanolammonium-N-(2 - hydroxyethyl)-nitrilodiacetate and sodium salt of nitrilotriacetic acid and of citric acid. (See Newsweek, Aug. 24, 1970, p. 48; European Chemical News, 440/1970, p. 32.)

However, these compounds cannot be utilized in large amounts because they exhibit too great a complex-forming power with heavy metals and transition metals, which would lead to either a depletion or enrichment of trace elements in the waters and consequently would likewise result in a disturbance of the biological equilibrium.

Therefore, other types of organic compounds have been made available as builders which do not exhibit such disadvantages.

In German published unexamined application OS 1,467,656, published Oct. 23, 1969, alkali salts of homo- and copolymers of unsaturated dicarboxylic acids, optionally with monomers, e.g., $\alpha$-olefins, or copolymerizable monocarboxylic acids, are described as builders.

Although these types of compounds, in combination with tensides, produce a visible increase in the cleansing power of detergents, the results still are not fully satisfactory.

Additionally, the types described in OS 1,467,656 exhibit a noticeable gap, since styrene and isobutylene cannot be employed as genuine comonomers of the basic polymers (see loc. cit. p. 7, first and second complete paragraphs).

These disadvantages are overcome by the builders of this invention.

SUMMARY OF THE INVENTION

The washing compositions of this invention contain as a builder a water-soluble salt of a homo- or copolymer of an unsaturated aliphatic carboxylic acid of 4–6 carbon atoms, or a copolymer thereof with a copolymerizable monomer of 2–8 carbon atoms wherein the polymer is in the form of an amino partial amide.

As the water-soluble salts, the alkali, preferably alkali-metal, salts are ordinarily employed, preferably the sodium salts.

The amino partial amides of this invention are N-substituted amides (as opposed to primary or ammonia amides) and include both N-mono- and N-di-substituted amides. These partial amides can be produced in accordance with conventional methods. Basically two different ways are available for their production, viz., (a) Production of the copolymer from the polycarboxylic acid anhydride and comonomer and thereafter amidation of the anhydride groups of the copolymer with the selected amine, and (b) Production of the monomeric hemi-amide of an unsaturated dicarboxylic acid and subsequent polymerization or copolymerization thereof.

Amines which can advantageously be employed in the production of the amides are:

(1) Primary alkyl amines, preferably wherein alkyl in each instance contains 1 to 20 carbon atoms, more preferably 3 to 12 carbon atoms, e.g., ethylamine, n-propylamine, allylamine, n-butylamine, pentylamine, octylamine, dodecylamine and isobutylamine. Also suitable are the corresponding primary alkyl amines in which the alkyl group bears a substituent, preferably $\beta$, $\gamma$ or $\omega$ to the amino nitrogen atom, for example, an aryl, preferably phenyl, group, e.g., benzylamine, phenethylamine and 2-phenylpropylamine; a heterocyclic amino group, preferably 5–6 ring membered and containing 0–1 other hetero ring atoms, e.g., O, S or N, e.g., morpholino, piperidino or pyrrolidino, e.g., N-(3-aminopropyl)-morpholine, N-(3 - aminopropyl)-piperidine, N-(2-aminoethyl)-morpholine; an alkoxy group, preferably of 1 to 20 carbon atoms, more preferably 8 to 14 carbon atoms, e.g., methoxypropylamine, lauryloxypropylamine, ethoxypropylamine, methoxyethylamine, an aryloxy group, preferably phenoxy, group, e.g., 2 - phenoxyethyl-amine, 3 - phenoxypropylamine; a dialkylamino group, preferably of 1 to 12 carbon atoms, more preferably 1 to 4 carbon atoms, e.g., N,N-dimethylpropylenediamine, N,N-diethylpropylenediamine; or a carboxyl group, e.g., glutamic acid, glycine (aminoacetic acid), $\alpha$-aminopropionic acid, $\beta$-aminopropionic acid, $\alpha$-aminobutyric acid, $\beta$-aminovaleric acid.

(2) Primary cycloalkyl amines, preferably having 5 to 6 ring members, e.g., cyclohexylamine and cyclopentylamine.

(3) Primary amino substituted heterocyclic aromatic amines, e.g., 2-amino-pyridine, 6-amino-2-methyl-pyridine, 2 - amino - 3 - methyl-pyridine, 2-amino-4-äthyl-pyridine, 5-amino-isochinoline.

(4) Secondary alkyl and cycloalkyl amines otherwise corresponding to the above, e.g., diethylamine, diisopropylamine, di-n-butylamine, di-n-hexadecylamine, dibenzylamine, butylmethylamine and ethylhexadecylamine.

(5) Secondary heterocyclic amines, preferably containing 5–6 ring members in the heterocyclic ring and 0–1 other heteroatoms, e.g., O, S, N and 0–1 carbocyclic, preferably aryl rings, attached or fused thereto, e.g., morpholine, piperidine, pyrrolidine, N-methylpiperazine and 2,3-dihydroindole.

(6) Primary and secondary arylamines, e.g., aniline, N-methylaniline and p-aminodimethylaniline.

Preferably, the partial amide of the selected polymers or copolymers is a hemi-amide. However, any degree of amidization from about 5 to 70%, preferably about 10 to 50%, of theory is operable.

Examples of unsaturated polycarboxylic acids or the anhydrides thereof which can be employed for production of the homo- and/or co-polymers which are present as partial amide salts in the washing agents of this invention are maleic anhydride, itaconic acid, citraconic acid and aconitic acid. The dicarboxylic acids are preferred and of these, maleic anhydride is preferred.

The monomers of 2 to 8 carbon atoms copolymerizable with the unsaturated polycarboxylic acids are α-olefins, preferably of 2–4 carbon atoms, e.g., ethylene, propylene, isobutylene and 2-methyl-1-pentene, and the corresponding α-olefins bearing an aryl, preferably phenyl, substituent, e.g., styrene and α-methylstyrene. Of these, styrene is preferred.

The molar percentage of α-olefin to unsaturated carboxylic acid is usually about 30–60, preferably about 50, molar percent.

The homo- and/or co-polymers from which the partial amides are based can be prepared according to the processes as they are described, for example, in German published unexamined applications OS 1,944,756 and OS 1,645,100, the disclosures of which are incorporated by reference. The polymer can have any degree of polymerization which retains the solubility or dispersibility of the polymeric salt in water, e.g., 2–3000, preferably 5–1000.

Examples of specific amidated homopolymers and copolymers employed in the compositions of this invention, including those set forth in the examples below are N-butylamine, benzylamine, N-(3-aminopropylmorpholine), methoxypropylamine, 3-phenoxypropylamine, N,N-diethylpropylenediamine, cyclohexylamine, di-n-butylamine, dicyclohexylamine, dibenzylamine, morpholine, aniline and methylaniline hemi-amides of 1:1 maleic anhydride styrene copolymer, sodium salts; of a 1:1 maleic anhydride isobutylene copolymer; and of a 1:1 maleic anhydride ethylene copolymer, each having a K value of about 50 and a degree of polymerization of ~250.

The washing agents of this invention can contain, as detergents, conventional anionic, nonionic, and cationic tensides, or other detergents, e.g., amphoteric and zwitterionic detergents. Examples of anionic detergents are the alkylaryl sulfonates, alkane sulfonates, olefin sulfonates, alkyl sulfonates, alkyl ether sulfates, alkyl phosphates and alkyl ether phosphates, etc.

Examples of nonionic tensides are alkyl polyglycol ethers, alkyl phenol polyglycol ethers, fatty acid polyglycol esters, fatty acid alkylolamides, fatty acid amide polyglycol ethers and propyleneglycol-ethylene oxide addition products, etc.

Examples of cationic detergents are quaternized fatty amine polyglycol ethers.

The washing agents can also contain other conventional additives, e.g., silicates, borates, carboxycellulose, sodium sulfate, and soda (sodium carbonate).

The washing agents of this invention consist of about 5–80% by weight, preferably 20–60% by weight, of builder. The surface-active compound and other additives are usually present in the following proportions, by weight:

| | Percent |
|---|---|
| Surface-active compound | 5–20 |
| Sodium perborate | 0–20 |
| Sodium sulfate | 0–40 |
| Soda | 0–20 |
| Silicates | 0–15 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The following is an illustration of the method of preparation (a) described above.

PREPARATION A 77 parts by weight of isobutylene/maleic anhydride copolymer is dissolved in 1000 parts by weight of acetone. At room temperature, 72 parts by weight of N-(3-aminopropyl)-morpholine, dissolved in 250 parts by weight of acetone, is added dropwise to this solution over a period of two hours. The hemi-amide is thus produced in the solid phase and can be worked up in accordance with the usual methods.

The following is an illustration of the method of preparation (b) described above.

PREPARATION B 141 parts by weight of the N-(3-aminopropyl)-morpholine hemi-amide of maleic acid and 52 parts by weight of styrene are dissolved in 1000 parts by weight of acetone. After the addition of 2 parts by weight of azoisobutyronitrile, the mixture is polymerized at 60° C. for 6 hours. The copolymer is precipitated and can be worked up in accordance with conventional methods.

The following illustrates the production of a copolymer prepared according to the process of OS 1,944,756 and OS 1,645,100 from which a partial amide is prepared.

PREPARATION C 980 parts by weight of maleic anhydride and 673 parts by weight of isobutylene are dissolved in 6000 parts by weight of benzene. After the addition of 14 parts by weight of benzoyl peroxide, the mixture is agitated for 6 hours at 70° C. in a sealed vessel. The copolymer is precipitated and can be worked up in accordance with the customary methods.

Other olefin/acid anhydride copolymers are likewise produced in an analogous manner.

The following are examples of washing compositions of this invention.

EXAMPLE (a) Complete washing agent:

| | Percent by weight |
|---|---|
| Lauryl sulfate | 10 |
| Sodium alkane sulfonate (straight-chain $C_{13}$–$C_{17}$ alkane sulfonate) | 17 |
| N - (3 - aminopropyl) morpholine hemi-amide of styrene/maleic anhydride copolymer | 35 |
| Sodium silicate (pulverized) | 6 |
| Magnesium silicate | 2 |
| Carboxymethylcellulose | 1 |
| Sodium sulfate | 13 |
| Sodium perborate | 16 |

(b) Heavy-duty washing agent:

| | |
|---|---|
| Dodecylbenzenesulfonate | 14 |
| Soda | 20 |

EXAMPLE—Continued (b) Heavy-duty washing agent: Percent by weight
N,N-dimethyltrimethylenediamine hemi-amide of
the copolymer isobutylene/maleic anhydride -- 30
Sodium silicate ------------------------------ 8
Sodium perborate ---------------------------- 10
Carboxymethylcellulose ---------------------- 1
Remainder water.

(c) Fine washing agent:
Nonylphenol oxyethylate ---------------------- 8
Fatty alcohol sulfate ------------------------ 5
N-(3-aminopropyl)-morpholine hemi-amide of
the copolymer styrene/maleic anhydride ---- 60
Sodium sulfate ------------------------------ 27

(d) Metal cleanser (alkaline):
Quaternized fatty amine polyglycol ether ----- 5
N-(3-aminopropyl)-morpholine hemi-amide of
the copolymer styrene/maleic anhydride ---- 10
Sodium silicate ------------------------------ 6
Potassium hydroxide solution, 50% ----------- 4
Water --------------------------------------- 75

In order to compare the effects of washing agents of this invention with those of washing agents of the relevant state of the art (OS 1,467,656), the following experiments were conducted:

WFK[1] test cotton fabric was washed in a 12-chamber laboratory washing machine[2] at 90° C. respectively 30 minutes in an aqueous liquor. The washing liquors in each case contained 1 g./l. sodium n-dodecylbenzenesulfonate and builder, in amounts per liter, as set forth below. The pH of the liquors was 9.2. The brightening of the thus-washed fabric was measured by determining the reflectance by means of the "Elrepho" photometer (Zeiss). The apparatus was calibrated at a filter B57 against the standard No. 20707.

The relative cleansing value was calculated from 24 individual measurements as follows:

$$\frac{(a-b)\cdot 100}{c-b} = \text{Percent washing value}$$

$a$ = reflectance value fabric, washed
$b$ = reflectance value fabric, test-soiled
$c$ = reflectance value fabric, unsoiled.

The following are examples of washing employing various washing compositions.

EXAMPLE 1

(Comparative example)

In a washing liquor containing 1 g./liter of sodium n-dodecylbenzenesulfonate as the surface-active agent and varying amounts of the sodium salt of a styrene-maleic-anhydride copolymer as the builder (K-value 50, corresponding to a degree of polymerization of ~250; produced analogously to the method described in preparation C) in soft water, a soiled test fabric was washed as in the above-described testing method. The following washing values were obtained.

| Builder, g./l.: | Washing value, percent |
|---|---|
| 1 | 22 |
| 2 | 28 |
| 4 | 29 |
| 6 | 25 |

EXAMPLE 2

The procedure of Example 1 was followed except the builder was replaced by the sodium salt of the N-(3-aminopropyl)-morpholine hemi-amide of the styrene-maleic anhydride copolymer utilized in Example 1 (K-value 50, corresponding to a degree of polymerization of ~250). The improved washing values can be seen from the following table.

| Builder, g./l.: | Washing value, percent |
|---|---|
| 1 | 41 |
| 2 | 45 |
| 4 | 42 |
| 6 | 42 |

EXAMPLE 3

The builder of Example 1 was replaced by the sodium salt of the butylamine hemi-amide of the styrene-maleic acid copolymer utilized in Example 1 (K-value 50, degree of polymerization ~250). The improved washing values can be seen from the following table.

| Builder, g./l.: | Washing value, percent |
|---|---|
| 1 | 40 |
| 2 | 40 |
| 4 | 39 |
| 6 | 40 |

EXAMPLE 4

The procedure as set forth in Example 1 is followed except the sodium salt of the cyclohexylamine hemi-amide of the styrene-maleic anhydride copolymer of that example is employed as the builder (K-value 50, degree of polymerization ~250). The improvement in the washing value is shown by the following table.

| Builder, g./l.: | Washing value, percent |
|---|---|
| 1 | 35 |
| 2 | 37 |
| 4 | 38 |
| 6 | 37 |

EXAMPLE 5

The procedure of Example 1 is followed except the builder employed is the sodium salt of 2-aminopyridine hemi-amide of the styrene-maleic anhydride copolymer employed in Example 1. The results of the washing test are set forth in the table below.

| Builder, g./l.: | Washing value, percent |
|---|---|
| 1 | 30 |
| 2 | 35 |
| 4 | 41 |
| 6 | 38 |

EXAMPLE 6

The procedure of Example 1 is followed except the builder employed is the sodium salt of glutamic acid hemi-amide of the styrene-maleic anhydride copolymer employed therein. The improved washing values are shown in the table below.

| Builder, g./l.: | Washing value, percent |
|---|---|
| 1 | 37 |
| 2 | 41 |
| 4 | 40 |
| 6 | 38 |

EXAMPLE 7

(Comparative example)

Washing compositions were employed in amounts such that the washing liquor contained 1 g./l. of sodium n-dodecylbenzenesulfonate as the surface-active agent and varying amounts of the sodium salt of a 1:1 (molar ratio) copolymer of isobutylene and maleic anhydride, the production of which is described in preparation C (ISMA; K-value 70, degree of polymerization ~500). A soiled test fabric was washed in softened water containing these compositions as in the above-mentioned testing method.

---

[1] WFK = Wäscherei-Forschungsanstalt Krefeld; the WFK-test cotton fabric is a fabric soiled in a standardized manner, not published.
[2] This is a Launder-O-Meter of the Atlas Electric Co., Chicago, U.S.A.

The washing values obtained are shown in the table below.

| Builder, g./l.: | Washing value, percent |
|---|---|
| 1 | 22 |
| 2 | 30 |
| 4 | 28 |
| 6 | 25 |

EXAMPLE 8

The procedure of Example 7 is followed except the builder is the sodium salt of N-(3-aminopropyl)-morpholine hemi-amide of the isobutylene-maleic anhydride copolymer employed in Example 7.

The improved washing values obtained are shown in the table below.

| Builder, g./l.: | Washing value, percent |
|---|---|
| 1 | 35 |
| 2 | 40 |
| 4 | 42 |
| 6 | 40 |

EXAMPLE 9

The procedure of Example 7 is followed except the builder is the sodium salt of butyl hemi-amide of the isobutylene-maleic anhydride copolymer employed in Example 7. The improved washing values thus obtained are listed in the table below.

| Builder, g./l.: | Washing value, percent |
|---|---|
| 1 | 38 |
| 2 | 40 |
| 4 | 40 |
| 6 | 39 |

EXAMPLE 10

(Comparative example)

The procedure of Example 7 is followed except the builder employed is the sodium salt of a 1:1 (molar ratio) copolymer of ethylene and maleic anhydride having a K-value of 40; a degree of polymerization of ~150. The copolymer is produced analogously to the method set forth in preparation C. The washing values obtained are set forth in the table below.

| Builder, g./l.: | Washing value, percent |
|---|---|
| 1 | 30 |
| 2 | 36 |
| 4 | 33 |
| 6 | 34 |

EXAMPLE 11

The procedure of Example 10 is followed except the builder is the sodium salt of N-(3-aminopropyl)-morpholine hemi-amide of the copolymer of ethylene and maleic anhydride employed in Example 10. The improved washing values are set forth in the table below.

| Builder, g./l.: | Washing value, percent |
|---|---|
| 1 | 35 |
| 2 | 42 |
| 4 | 45 |
| 6 | 43 |

EXAMPLE 12

(Comparative example)

The procedure as set forth in Example 1 is employed except the builder is the sodium salt of a 1:1 (molar ratio) copolymer of styrene and itaconic acid having a K-value 60 and degree of polymerization, ~300. The copolymer is produced analogously to the method set forth in preparation C. The washing values obtained are set forth in the table below.

| Builder, g./l.: | Washing value, percent |
|---|---|
| 1 | 25 |
| 2 | 27 |
| 4 | 30 |
| 6 | 25 |

EXAMPLE 13

The procedure of Example 12 is observed; however, the builder is the sodium salt of N-(3-aminopropyl)-morpholine hemi-amide of the styrene-itaconic acid copolymer. The improved washing values are shown in the table below.

| Builder, g./l.: | Washing value, percent |
|---|---|
| 1 | 37 |
| 2 | 39 |
| 4 | 40 |
| 6 | 35 |

EXAMPLE 14

The procedure of Example 2 is followed, except a sodium salt of N-(3-aminopropyl)-morpholine amide in which only 25 molar percent of the present carboxyl groups are amidated is employed. The improved washing values are shown in the table below.

| Builder, g./l.: | Washing value, percent |
|---|---|
| 1 | 37 |
| 2 | 38 |
| 4 | 40 |
| 6 | 36 |

A comparison of the washing values of the washing agents of this invention with corresponding prior art formulations demonstrates the surprisingly greater effectiveness of the washing compositions of this invention.

EXAMPLE 15

(Comparative example)

The procedure of Example 1 is followed except the builder employed is the sodium salt of a polymaleic acid (degree of polymerization ~10). The washing values obtained are set forth in the table below.

| Builder, g./l.: | Washing value, percent |
|---|---|
| 1 | 38 |
| 2 | 40 |
| 4 | 42 |
| 6 | 42 |

EXAMPLE 16

The procedure as set forth in Example 1 is employed except the builder is the sodium salt of the N,N-dimethyltrimethylene diamine hemi-amide of a polymaleic acid (degree of polymerization ~10). The improved washing values are set forth in the table below.

| Builder, g./l.: | Washing value, percent |
|---|---|
| 1 | 50 |
| 2 | 51 |
| 4 | 48 |
| 6 | 45 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions,

What is claimed is:

1. A method of washing fabrics which comprises contacting a fabric with an aqueous washing liquor comprising a detergent composition containing in parts by weight 5-20% surface-active compounds; 0-20% sodium perborate; 0-40% sodium sulfate; 0-20% soda; and 0-15% silicates together with 5-80%, as a builder, of a polymer of an unsaturated aliphatic polycarboxylic acid of 4-6 carbon atoms in the form of a water-soluble salt of an amino partial amide of the polymeric acid.

2. A method according to claim 1, wherein said detergent is one containing 20-60% by weight of the polymeric builder.

3. A method according to claim 1, wherein the builder polymer is a copolymer having an unsaturated dicarboxylic acid anhydride content of 30-60 molar percent.

4. A method according to claim 3, wherein the builder polymer is a copolymer having an unsaturated dicarboxylic acid anhydride content of about 50 molar percent.

5. A method according to claim 1, wherein about 10-50 molar percent of the carboxyl groups of the builder polymer are amidated.

6. A method according to claim 1, wherein the unsaturated polycarboxylic acid is a dicarboxylic acid.

7. A method according to claim 6, wherein the builder polymer is a copolymer of maleic anhydride.

8. A method according to claim 1, wherein the builder polymer is a copolymer of an α-olefin or aryl-substituted α-olefin.

9. A method according to claim 6, wherein the builder polymer is a copolymer of maleic anhydride and styrene.

10. A method according to claim 6, wherein the builder polymer is a copolymer of maleic anhydride and isobutylene.

11. A method according to claim 6, wherein the builder polymer is a copolymer of maleic anhydride and ethylene.

12. A method according to claim 1, wherein the soluble salt is an alkali salt.

13. A method according to claim 12, wherein the builder partial amide is a secondary amide.

14. A method according to claim 12, wherein the substituent on the amido nitrogen atom is unsubstituted n-alkyl of 2-20 carbon atoms or the corresponding alkyl group substituted by aryl, dialkylamino, heterocyclic amino, alkoxy or carboxy.

15. A method according to claim 14, wherein the n-alkyl group of 2-16 carbon atoms is heterocyclic amino substituted.

16. A method according to claim 15, wherein the n-alkyl group is substituted by morpholino.

17. A method according to claim 16, wherein the amido nitrogen atom is substituted by 3-morpholinopropyl.

18. A method according to claim 17, wherein the polymer is a copolymer of maleic anhydride.

19. A method according to claim 18, wherein the builder polymer is a copolymer of maleic anhydride and styrene.

20. A method according to claim 18, wherein the builder polymer is a copolymer of maleic anhydride and isobutylene.

21. A method according to claim 18, wherein the builder polymer is a copolymer of maleic anhydride and ethylene.

22. A method according to claim 14, wherein the amide is a tertiary amide.

23. A method according to claim 14, wherein the n-alkyl group contains 2-16 carbon atoms and is substituted by a dialkylamino group.

24. A method according to claim 14, wherein the n-alkyl group contains 2-16 carbon atoms and is substituted by an alkoxy group.

25. A method according to claim 14, wherein the n-alkyl group contains 2-8 carbon atoms and is substituted by a carboxyl group.

26. A method according to claim 13, wherein the substituent on the amido nitrogen is cycloalkyl of 5 or 6 carbon atoms.

27. A method according to claim 13, wherein the substituent on the amido nitrogen is a 5- or 6-membered heterocyclic ring.

28. A detergent composition comprising:

| | Percent by weight |
|---|---|
| Lauryl sulfate | 10 |
| Sodium alkane sulfonate (straight-chain $C_{13}$–$C_{17}$ alkane sulfonate) | 17 |
| N-(3-aminopropyl)-morpholine hemi-amide of a styrene/maleic anhydride copolymer | 35 |
| Sodium silicate (pulverized) | 6 |
| Magnesium silicate | 2 |
| Carboxymethylcellulose | 1 |
| Sodium sulfate | 13 |
| Sodium perborate | 16 |

29. A detergent composition comprising:

| | Percent by weight |
|---|---|
| Dodecylbenzenesulfonate | 14 |
| Soda | 20 |
| N,N-dimethyltrimethylenediamine hemi-amide of an isobutylene/maleic anhydride copolymer | 30 |
| Sodium silicate | 8 |
| Sodium perborate | 10 |
| Carboxymethylcellulose | 1 |
| Remainder water. | |

30. A detergent composition comprising:

| | Percent by weight |
|---|---|
| Nonylphenol oxyethylate | 8 |
| Fatty alcohol sulfate | 5 |
| N-(3-aminopropyl)-morpholine hemi-amide of a styrene-maleic anhydride copolymer | 60 |
| Sodium sulfate | 27 |

31. A detergent composition comprising:

| | Percent by weight |
|---|---|
| Quaternized fatty amine polyglycol ether | 5 |
| N-(3-aminopropyl)-morpholine hemi-amide of a styrene/maleic anhydride copolymer | 10 |
| Sodium silicate | 6 |
| Potassium hydroxide solution, 50% | 4 |
| Water | 75 |

References Cited

UNITED STATES PATENTS

| 2,702,277 | 2/1955 | Kinney | 252—89 |
| 3,085,916 | 3/1963 | Zimmie | 252—Dig. 2 |
| 3,308,067 | 3/1967 | Diehl | 252—161 |
| 3,326,807 | 6/1967 | Guest et al. | 252—152 |

JOHN D. WELSH, Primary Examiner

U.S. Cl. X.R.

252—D. 15, 534

UNITED STATES PATENT OFFICE
CERTIFICATE OF CORRECTION

Patent No. 3,798,180　　　　　　　　Dated March 19, 1974

Inventor(s) Helmut Westernacher

It is certified that error appears in the above-identified patent and that said Letters Patent are hereby corrected as shown below:

IN THE CLAIMS:

Claim 14, Column 9, Line 1 of the Claim: "according to claim 12" should read -- according to claim 13 --.

Signed and sealed this 16th day of July 1974.

(SEAL)
Attest:

McCOY M. GIBSON, JR.　　　　　　　C. MARSHALL DANN
Attesting Officer　　　　　　　　　Commissioner of Patents